Patented Aug. 5, 1930

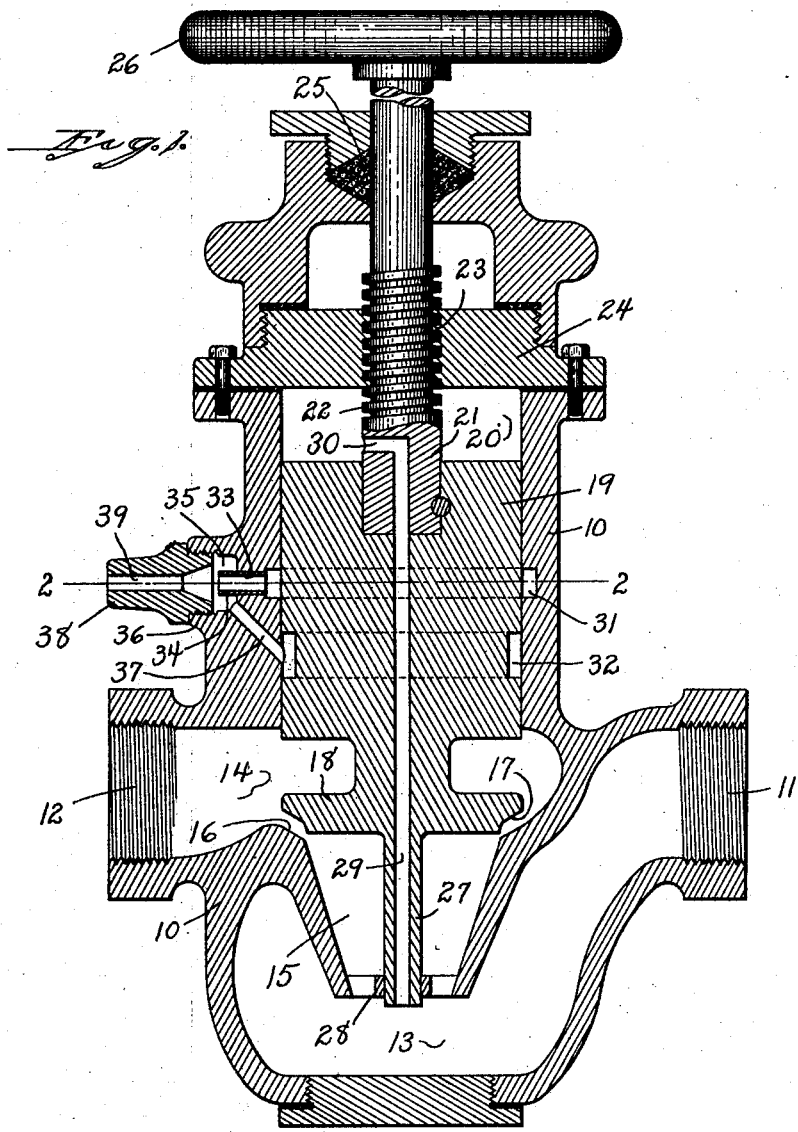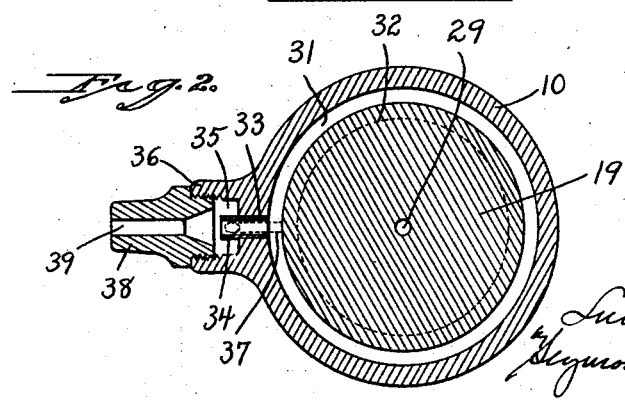

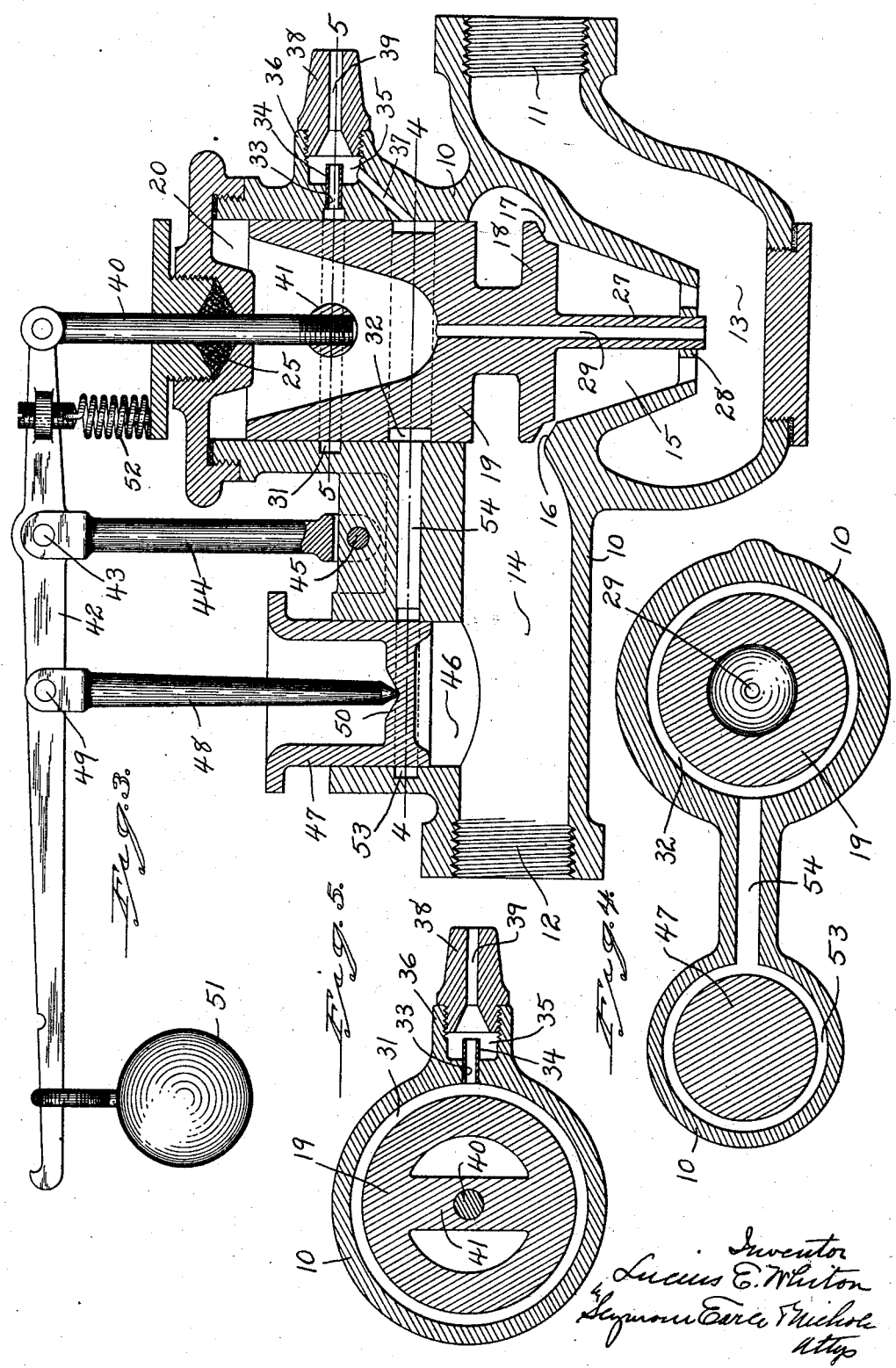

1,772,406

UNITED STATES PATENT OFFICE

LUCIUS E. WHITON, OF NEW LONDON, CONNECTICUT, ASSIGNOR TO THE D. E. WHITON MACHINE CO., OF NEW LONDON, CONNECTICUT, A CORPORATION

VALVE

Application filed April 6, 1928. Serial No. 268,008.

This invention relates to an improvement in valves and particularly to that type of valves known as "balanced" valves of the type generally employed for controlling high-pressure fluids, such as steam.

The object of this invention is to produce a balanced valve constructed and arranged so that the relatively-high pressure in the inlet-chamber on one side of the valve-closure is prevented from leaking into the low-pressure chamber on the opposite side of the valve-closure when the valve is closed and so build up dangerous pressures in the outlet-chamber and such apparatus as may be supplied with steam or other fluid therefrom.

With this object in view, my invention consists in a balanced valve characterized by means whereby both ends of this movable closure-member are subjected to counterbalancing pressure from the high-pressure chamber, and an annular high-pressure leak-groove and vent to prevent pressure from the high-pressure chamber from leaking into the low-pressure chamber when the valve is closed.

My invention further consists in a balanced valve characterized as above and provided, in addition, with a low-pressure leak-groove connected to the high-pressure leak-groove in such manner that the escape of high-pressure steam from the high-pressure leak-groove will serve to draw off the low-pressure leakage from the low-pressure leak-groove.

My invention further consists in a balanced valve characterized as above and having certain details of construction and combinations of parts as will be hereinafter described and particularly recited in the claims.

In the accompanying drawings:

Fig. 1 is a vertical central sectional view through a balanced valve constructed in accordance with my invention;

Fig. 2 is a horizontal sectional view on the line 2—2 of Fig. 1;

Fig. 3 is a vertical central sectional view of an automatic pressure-regulating valve embodying my invention;

Fig. 4 is a horizontal sectional view thereof on the line 4—4 of Fig. 3;

Fig. 5 is a corresponding view on the line 5—5 of Fig. 3.

In carrying out my invention as shown in Figs. 1 and 2, the valve-body 10 is provided with the usual inlet- and outlet-ports 11 and 12 respectively. The inlet-port 11 supplies steam to a high-pressure chamber 13 from which it escapes to the low-pressure chamber 14 through a tapered passage 15.

Surrounding the upper end of the tapered passage just mentioned is an inclined valve-seat 16 for co-action with the correspondingly sloped underface 17 of a disk-like closure 18 formed at the lower end of a plunger 19, which latter reciprocates in a high-pressure chamber 20 and is operated in the ordinary way by providing the lower end of its stem 21 with threads 22 engaging internal threads 23 in the upper portion 24 of the valve-body 10. The valve-stem 21 extends upward through a packing-gland 25 and is provided at its upper end with a hand-wheel 26. Extending downward from the closure 18 is a guide-stem 27 bearing in a skeletonized ring 28 formed at the lower end of the passage 15 aforesaid.

In order that the closure 18 may be easily and readily brought to a bearing upon the seat 16 against the resistance of the high-pressure from the chamber 13, I provide a passage 29 leading vertically upward from the high-pressure chamber 13 through the guide-stem 27, closure 18, plunger 19, and the lower end of the valve-stem 21, at which point it is intersected by a transverse passage 30 formed in the valve-stem and opening into the upper end of the high-pressure chamber 20.

In order to prevent the high-pressure fluid from leaking past the plunger from the upper end of the high-pressure chamber 20 into the low-pressure chamber 14 and then building up undesirable pressures, I provide the wall of the high-pressure chamber 20 with an annular high-pressure leak-groove 31, and similarly provide the periphery of the plunger 19 near its lower end with an annular low-pressure leak-groove 32. The high-pressure leak-groove 31 is intersected at one side by a passage 33 which receives a short tube 34 projecting radially outward into a vacuum-chamber 35 formed in a boss 36 at one side of the body 10. The low-pressure leak-groove 32 is also connected to the vacuum-chamber by an inclined leak-passage 37 which intersects the wall of the chamber 20 adjacent to the low-pressure leak-groove 32, as clearly shown in Fig. 1. Screwed into the internally-threaded outer end of the boss 36 is a jet-bushing 38 having a central exhaust passage 39 flared at its inner end as shown, and arranged axially in line with the tube 34 aforesaid.

In the operation of the valve-structure shown in Figs. 1 and 2, the fluid being controlled by the valve passes upward from the chamber 13 through the passages 29 and 30 and into the upper end of the high-pressure chamber 20. Under ordinary circumstances, a small portion of this fluid will force its way downward between the walls of the chamber and the plunger and collect in the annular high-pressure leak-groove 31, from whence the major portion of the fluid will force its way outward through the tube 34 and the exhaust passage 39 of the jet-bushing 38, and by so doing will cause a partial vacuum in the chamber 35. A considerable leakage of steam from the high-pressure chamber 20 into the high-pressure leak-groove 31 is inevitable, owing to the necessity for a sliding fit between the wall of the chamber 20 and the periphery of the plunger 19.

A small portion of the fluid which has leaked into the high-pressure leak-groove 31, as above described, will force its way downward still further between the wall of the chamber 20 and the periphery of the plunger 19, where it will collect in the low-pressure leak-groove 32, where its pressure will be considerably lower than the pressure in the high-pressure groove 31, as a natural result of the effort required to penetrate the additional distance to the leak-groove 32. The fluid collecting in the low-pressure leak-groove 32, as just described, will be drawn upward into the vacuum-chamber 35 and ejected out through the exhaust-passage 39 by the vacuum-creating action of the high-pressure fluid in escaping through the tube 34 from the high-pressure leak-groove.

Referring now to Figs. 3 to 5 inclusive of the drawings, where I have shown my invention embodied in a type of valve known as an "automatic pressure-regulating valve," the plunger 19, instead of being actuated by a threaded valve-stem, is vertically moved by a reciprocating-stem 40 threaded into a diametrical-bar 41 in the said plunger. The upper end of the valve-stem 40 just mentioned is pivotally connected to a long counter-balancing bar 42 oscillating upon a stud 43 at the upper end of a fulcrum-link 44 which, in turn, is pivoted to the body by a stud 45.

In this embodiment of my invention, in addition to the chamber 20, I provide the body 10 with a vertical bore 46 intersecting the low-pressure chamber 14 at its lower end and adapted to receive a hollow reciprocating piston 47, the upward urge of which, under the action of the fluid in the low-pressure chamber, is communicated to the bar 42 by means of a vertical rod 48 which is pivoted to it by a stud 49; the said rod 48 having its lower end tapered to a sharp edge and resting in a recess 50 in the said piston.

The piston 47 just described, responsive to an increase of pressure in the chamber 14, tends to move the closure 18 toward its seat 16, so as to automatically maintain a substantially uniform pressure in the low-pressure chamber 14 in the usual manner of automatic valves. Regulation of the action of the piston 47 in moving the closure 18 as described is regulated by the positioning of a counterweight 51 depending from the oscillating-bar 42 and by further regulating the tension of an adjusting-spring 52.

To prevent the fluid from escaping outward from the low-pressure chamber 14, between the piston 47 and the bore 46 of the body, I provide an annular leak-groove 53 formed in the body 10 around the bore 46 into which it opens. A passage 54 connects the said groove 53 with the low-pressure leak-groove 32 of the plunger 19.

By the parts just described, in addition to preventing the high-pressure fluid from passing downward from the chamber 20 into the chamber 14, when the closure is seated upon its seat, I also provide for preventing the escape of the low-pressure fluid from the chamber 14 outward past the piston 47, since, at the same time, the low-pressure leak-groove 32 is being evacuated (as described in connection with the description of Figs. 1 and 2), the leak-groove 53 will also be evacuated, due to its connection with the low-pressure leak-groove 32 through the passage 54.

It is obvious, without further illustration, that it is immaterial whether the leak-grooves 31 and 32 are formed in the plunger 19, or in the walls of the chamber 20, in which the plunger moves so long as they are in position to intercept and collect fluid-leakage as described. Similarly, the leak-groove 53 may be formed either in the wall of the bore 56, as shown, or in the periphery of the piston 47, without departing from my invention.

I claim:

1. A balanced valve, comprising a casing provided with a high-pressure and a low-pressure chamber, a high-pressure and a low-pressure port for the said chambers respectively, a flow-passage connecting the said chambers; a movable closure controlling the flow of fluid through the said passage; a second high-pressure chamber formed in the said body, a plunger connected at one end to the said closure and movable in the said second high-pressure chamber; a fluid-passage connecting the first-mentioned high-pressure chamber and the second high-pressure chamber; an annular high-pressure leak-groove around the said plunger, and a vent-opening for the said high-pressure leak-groove.

2. A balanced valve, comprising a casing provided with a high-pressure and a low-pressure chamber, a high-pressure and a low-pressure port for the said chambers respectively, a flow-passage connecting the said chambers; a movable closure controlling the flow of fluid through the said passage, a second high-pressure chamber formed in the said body, a plunger connected at one end to the said closure and movable in the said second high-pressure chamber; a fluid-passage connecting the first-mentioned high-pressure chamber and the second high-pressure chamber; an annular high-pressure leak-groove and an annular low-pressure leak-groove around the said plunger, a vacuum-chamber; and two leak-passages respectively connecting the said leak-grooves with the said vacuum-chamber, whereby the escape of fluid from the said high-pressure leak-groove serves to draw off fluid from the low-pressure leak-groove.

3. A balanced valve, comprising a casing provided with a high-pressure and a low-pressure chamber, a high-pressure and a low-pressure port for the said chambers respectively, a flow-passage connecting the said chambers; a movable-closure controlling the flow of fluid through the said passage, a second high-pressure chamber formed in the said body, a plunger connected at one end to the said closure and movable in the said second high-pressure chamber; a fluid-passage extending longitudinally through the said plunger and connecting the first-mentioned high-pressure chamber and the second high-pressure chamber; an annular high-pressure leak-groove around the said plunger, and a vent-opening for the said high-pressure leak-groove.

4. A balanced valve, comprising a casing provided with a high-pressure and a low-pressure chamber, a high-pressure and a low-pressure port for the said chambers respectively, a flow-passage connecting the said chambers; a movable-closure controlling the flow of fluid through the said passage, a second high-pressure chamber formed in the said body, a plunger connected at one end to the said closure and movable in the said second high-pressure chamber; a fluid-passage extending longitudinally through the said plunger and connecting the first-mentioned high-pressure chamber and the second high-pressure chamber; an annular high-pressure leak-groove and an annular low-pressure leak-groove around the said plunger, a vacuum-chamber; and two leak-passages respectively connecting the said leak-grooves with the said vacuum-chamber, whereby the escape of fluid from the said high-pressure leak-groove serves to draw off fluid from the low-pressure leak-groove.

5. A balanced valve, comprising a casing provided with a high-pressure and a low-pressure chamber, a high-pressure and a low-pressure port for the said chambers respectively, a flow-passage connecting the said chambers; a movable-closure controlling the flow of fluid through the said passage, a second high-pressure chamber formed in the said body, a plunger connected at one end to the said closure and movable in the said second high-pressure chamber; a fluid-passage connecting the first-mentioned high-pressure chamber and the second high-pressure chamber; an annular high-pressure leak-groove and an annular low-pressure leak-groove around the said plunger, a vacuum-chamber; a leak-passage connecting the said high-pressure leak-groove with the said vacuum-chamber and including a tubular-member projecting into the said chamber, a leak-passage connecting the said low-pressure leak-groove with the said vacuum-chamber, whereby the escape of fluid from the said high-pressure leak-groove serves to draw off fluid from the low-pressure leak-groove.

6. A balanced valve, comprising a casing provided with a high-pressure and a low-pressure chamber, a high-pressure and a low-pressure port for the said chambers respectively, a flow-passage connecting the said chambers; a movable-closure controlling the flow of fluid through the said passage, a second high-pressure chamber formed in the said body, a plunger connected at one end to the said closure and movable in the said second high-pressure chamber; a fluid-passage connecting the first-mentioned high-pressure chamber and the second high-pressure chamber; an annular high-pressure leak-groove and an annular low-pressure leak-groove around the said plunger, a vacuum-chamber; a leak-passage connecting the said high-pressure leak-groove with the said vacuum-chamber and including a tubular-member projecting into the said vacuum-chamber, an exhaust-jet for the said vacuum-chamber having a passage arranged axially in line with the aforesaid tubular-member, a leak-passage connecting the said low-pressure leak-groove with the said vacuum-chamber, whereby the escape of fluid from the said high-pressure leak-groove serves to draw off fluid from the low-pressure leak-groove.

7. A balanced valve, comprising a casing provided with a high-pressure and a low-pressure chamber, a high-pressure and a low-pressure port for the said chambers respectively, a flow-passage connecting the said chambers; a movable closure controlling the flow of fluid through the said passage, a second high-pressure chamber formed in the said body, a plunger connected at one end to the said closure and movable in the said second high-pressure chamber; a fluid-passage connecting the first-mentioned high-pressure chamber and the second high-pressure chamber; an annular high-pressure leak-groove and an annular low-pressure leak-groove around the said plunger, a vacuum chamber; and two leak-passages respectively connecting the said leak-grooves with the said vacuum-chamber, a piston for urging the aforesaid closure toward its seat, an annular low-pressure leak-groove around the said piston, a passage connecting the last-mentioned leak-groove with the said vacuum-chamber, whereby the escape of fluid from the high-pressure leak-groove serves to draw off fluid from both of the low-pressure leak-grooves.

8. A balanced valve, comprising a casing provided with a high-pressure and a low-pressure chamber, a high-pressure and a low-pressure port for the said chambers respectively, a flow-passage connecting the said chambers; a movable closure controlling the flow of fluid through the said passage, a second high-pressure chamber formed in the said body, a plunger connected at one end to the said closure and movable in the said second high-pressure chamber; a fluid-passage connecting the first-mentioned high-pressure chamber and the second high-pressure chamber; an annular high-pressure leak-groove and an annular low-pressure leak-groove around the said plunger, a vacuum-chamber; and two leak-passages respectively connecting the said leak-grooves with the said vacuum-chamber, a piston for urging the aforesaid closure toward its seat, an annular low-pressure leak-groove around the said piston, a passage connecting the last-mentioned low-pressure leak-groove with the first-mentioned low-pressure leak-groove, whereby the escape of fluid from the high-pressure leak-groove serves to draw off fluid from both of the low-pressure leak-grooves.

In testimony whereof, I have signed this specification.

LUCIUS E. WHITON.